Feb. 3, 1970

R. E. OLSON 3,493,749

COUNTING STATISTICS IN RADIOACTIVE SAMPLING
APPARATUS BY SAMPLE ROTATION

Filed May 20, 1966

INVENTOR.
Robert E. Olson,
BY
Wolfe, Hubbard, Voit + Osann
ATTORNEYS.

INVENTOR.
Robert E. Olson,
BY
Wolfe, Hubbard, Voit & Osann
ATTORNEYS.

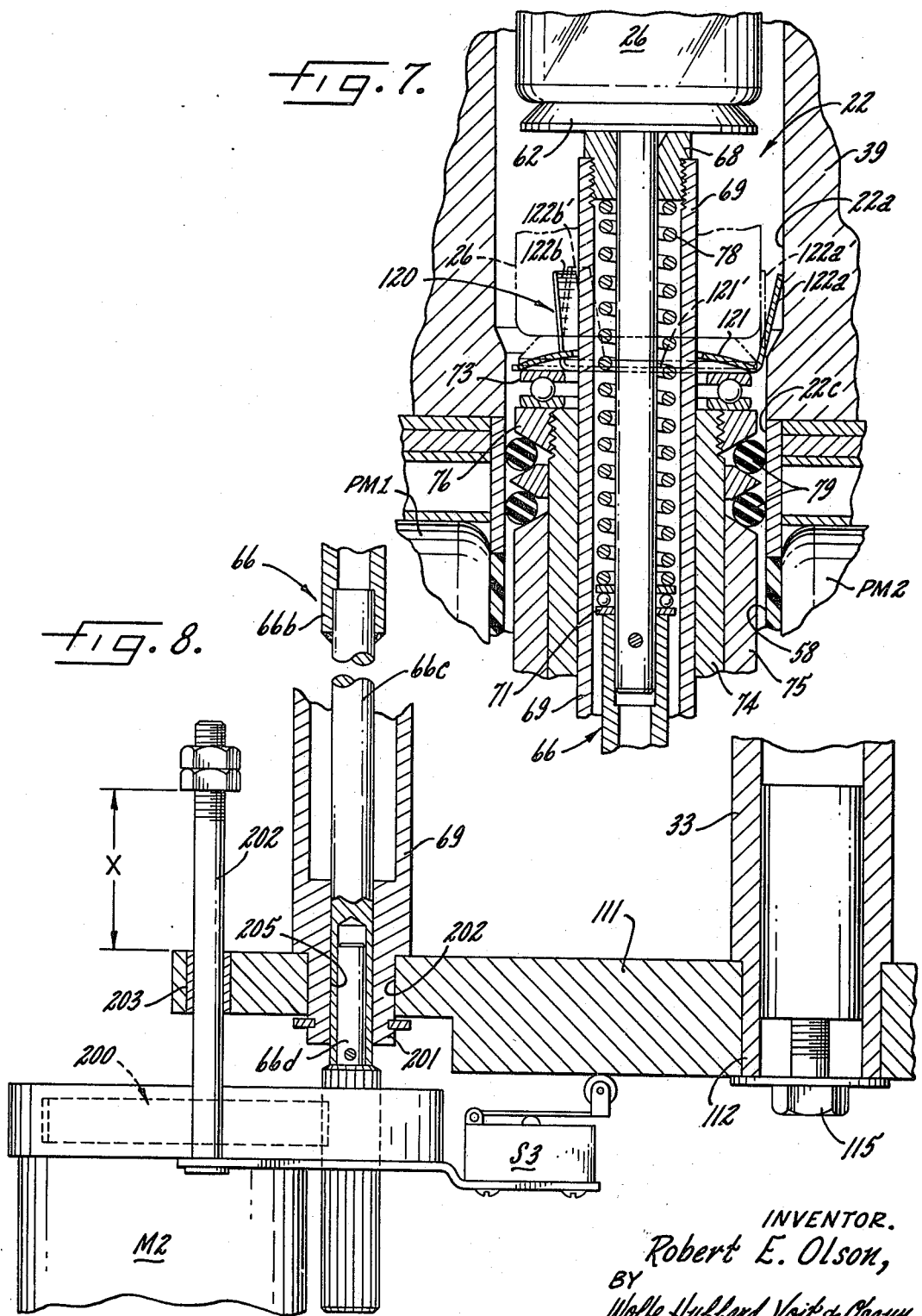

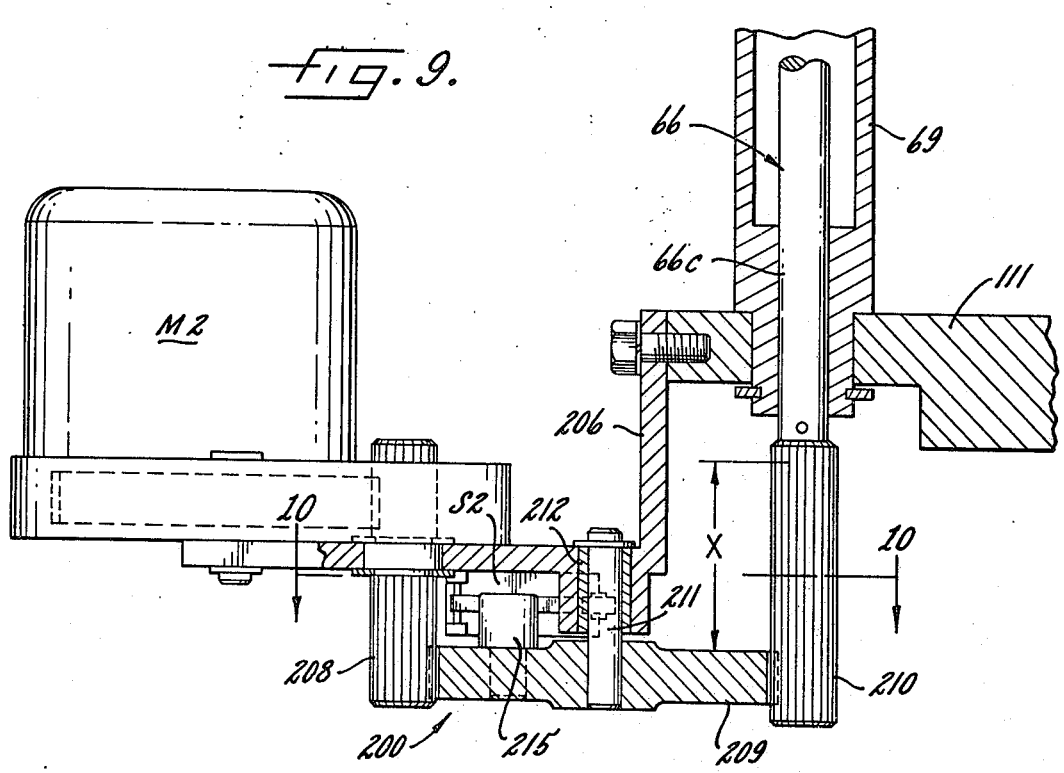
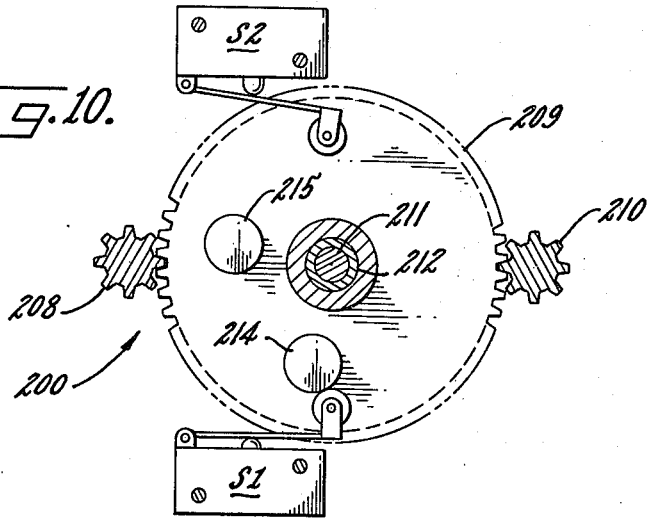

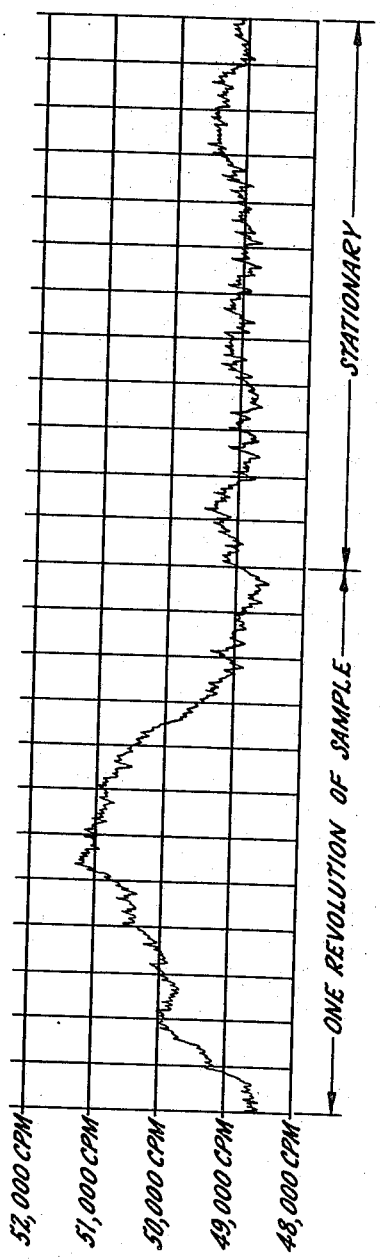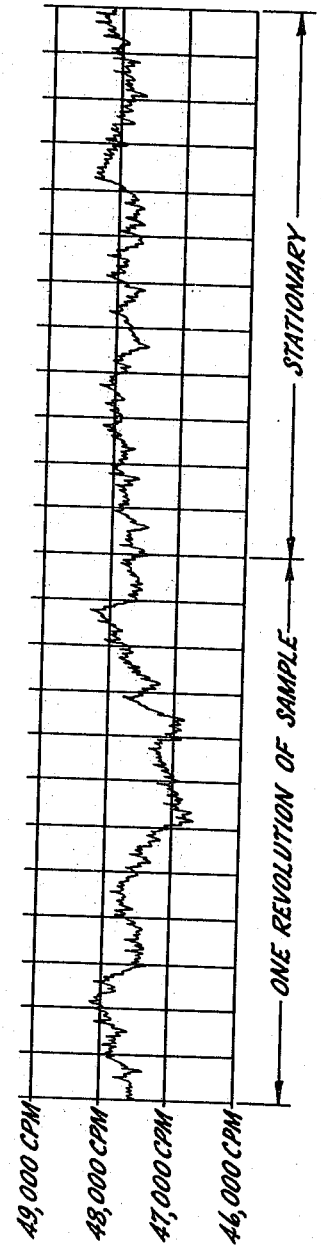

United States Patent Office 3,493,749
Patented Feb. 3, 1970

3,493,749
COUNTING STATISTICS IN RADIOACTIVE SAMPLING APPARATUS BY SAMPLE ROTATION
Robert E. Olson, Glen Ellyn, Ill., assignor to Packard Instrument Company, Inc., Downers Grove, Ill., a corporation of Illinois
Filed May 20, 1966, Ser. No. 551,592
Int. Cl. H01j 39/18; G21h 5/00
U.S. Cl. 250—71.5     18 Claims

ABSTRACT OF THE DISCLOSURE

In an apparatus for detecting and measuring radioactivity emanating from a sample, the statistical counting accuracy is improved by rotating the sample during a predetermined counting or measuring period. Particularly in conjunction with liquid scintillation counting, the sample is preferably rotated either an integral number of revolutions, or a large number of revolutions, during the counting and measuring period.

---

The present invention relates in general to apparatus for detecting and measuring radioactivity emanating from a sample and, more particularly, to means and methods for improving the precision and accuracy of such apparatus. The invention provides a system which is particularly although not exclusively applicable to the detection and measurement of radioactivity of a sample containing a radioactive isotope and a liquid scintillator by counting the light scintillations emitted by the sample.

Apparatus has heretofore been described for automatically transferring samples into the detection chamber of a scintillation counter in such a way as to avoid the leakage of any outside light into the chamber. Particularly useful transfer mechanisms, capable not only of preventing outside light from entering the chamber but of avoiding static electric charges produced within the chamber by the rubbing of plastic components, are described in Olson U.S. Patent No. 3,198,948, issued Aug. 3, 1965, and in Smith application Ser. No. 445,956, filed Apr. 6, 1965. A device has also been developed for improving the precision and accuracy of such apparatus and for eliminating static charges produced by rubbing of the sample against the apparatus, and is described in Olson application Ser. No. 447,831, filed Apr. 13, 1965. An object of the present invention is to further improve the precision and accuracy of such scintillation counting apparatus.

While not so limited in its application, the invention finds particular use in connection with scintillation counters employing a pair of light-responsive photomultipliers positioned on opposite sides of the detection chamber, and where the sample is contained within a transparent glass or plastic vial. Notwithstanding the maintenance of high manufacturing standards, the vials are often slightly out of round, have small but significant wall thickness variations, and have bottoms which are not perfectly flat and of uniform thickness. Such non-symmetric containers, it has been found, produce significant errors in scintillation counting, apparently by causing different amounts of light to be observed by each photomultiplier. Another object of the invention is to reduce or eliminate counting error due to non-symmetric containers.

Non-symmetry or non-homogeneity of the sample itself has also been found to be a serious cause of error in detecting and measuring radioactivity. Particularly when the radioactive isotope is in the form of a solid object such as a slug of metal or a localized concentration of radioisotope on a filter paper or on a strip of paper from a paper chromatography test, the scintillation count has been found to be sensitive to the positioning of the sample in a detection chamber. Heretofore it has been the practice to obtain a statistical radioactivity measurement of such samples by placing the sample in each of several positions within the chamber, detecting and measuring the radioactivity in each position, and averaging the results. A further object of the invention is to provide an apparatus and method for detecting and measuring the radioactivity of non-symmetrical or non-homogeneous samples without requiring laborious and time-consuming statistical averaging.

An overall objective of the invention is to provide a system for general use with radioactivity detecting and measurement apparatus whereby precision and accuracy of measurement are made independent of container and sample asymmetry, inhomogeneity, and other aberrations. An associated objective and aim is to provide such system for automatic, semi-automatic, or manual apparatus. As a consequence of attaining these objectives, the detection and measurement of radiation becomes a function of the activity of the sample alone, rather than a function of sample shape, sample placement, and the like.

Still another object and aim of the invention is to improve the rapidity of radiation analysis by increasing the confidence of a single counting. Previously, reliable counting had frequently required a plurality of measurements of the same sample, but with the inventive system a statistically significant result is obtained by one counting.

A further object is to provide an improved accessory for radioactivity counting apparatus which may be installed in newly constructed apparatus or incorporated into future designs of such apparatus.

Other objects and advantages of the invention will become apparent as the following description proceeds, taken in conjunction with the accompanying drawings, in which:

FIG. 7 is an enlarged, fragmentary, vertical sectional view of the apparatus shown in FIG. 1, here depicting the modified centering device of FIG. 6 in solid lines prior to actuation thereof, and in phantom lines after actuation thereof;

FIG. 8 is an enlarged, fragmentary, vertical sectional view of the apparatus of FIG. 1 and shows one form of a device for rotating portions of the sample transfer mechanism in one angular direction, the view of FIG. 8 being a construction of the lower portion of FIG. 5;

FIG. 9 is an enlarged, fragmentary, vertical sectional view similar to FIG. 8, and shows an alternative form of a device for rotating portions of the sample transfer mechanism with an oscillatory motion;

FIG. 10 is an enlarged, fragmentary, plane view taken along line 10—10 of FIG. 9;

FIG. 11 is a ratemeter recording made of a symmetric homogeneous, liquid carbon-14 sample placed 1/32 inch off center showing the effect on the measurement of rotating the sample; and FIG. 12 is a ratemeter recording, of a different homogeneous, liquid carbon-14 sample, showing the effect on the measurement of centering the sample and rotating the centered sample.

Figures 1, 2:
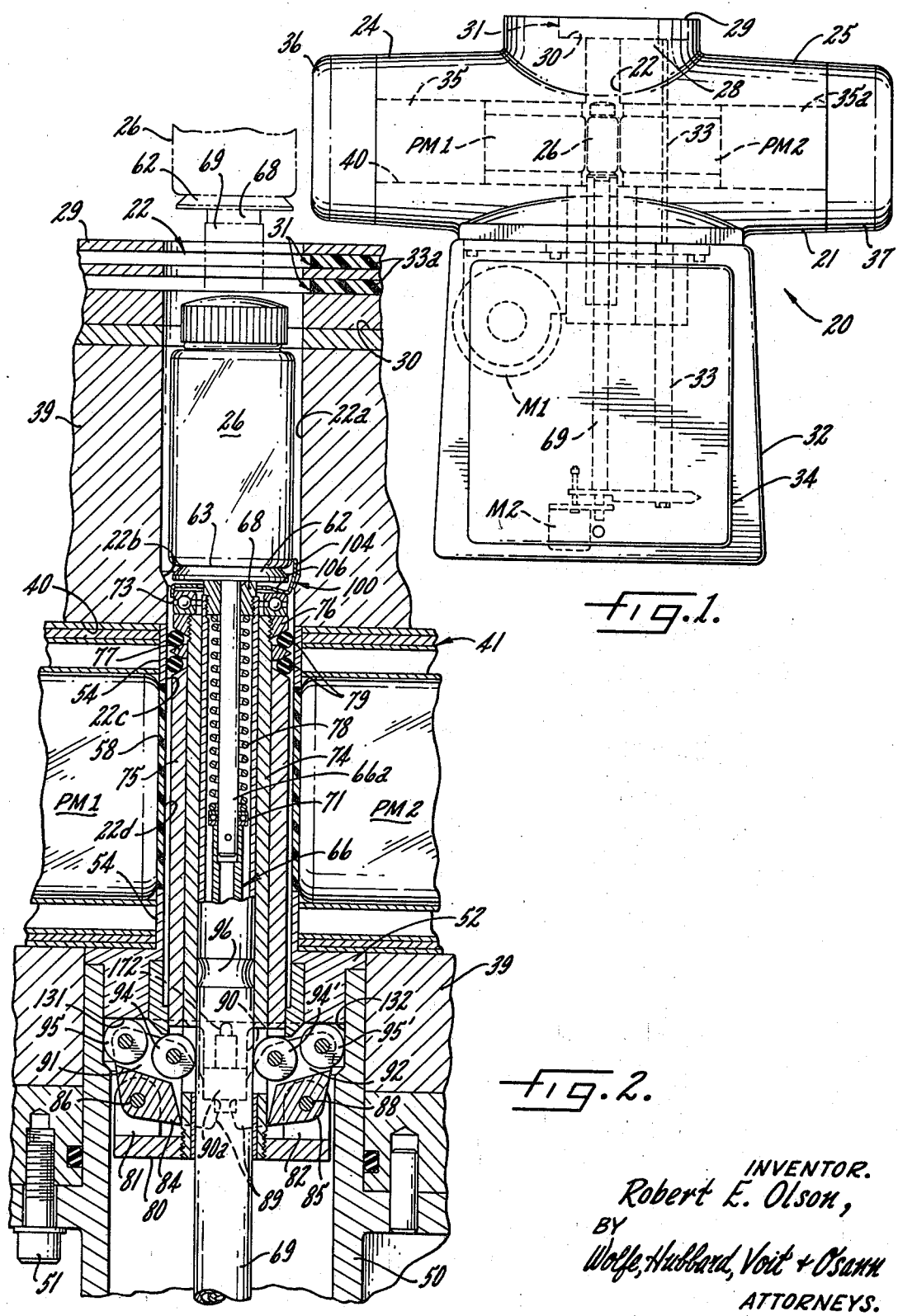
FIG. 1 is a front elevational view of an exemplary sample measuring apparatus embodying the features of the present invention.
FIG. 2 is an enlarged, fragmentary, vertical sectional view of the apparatus of FIG. 1 and illustrating details of a sample transfer mechanism, the mechanism here being shown during the initial portion of upward or outward elevator movement.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, there is illustrated in FIG. 1 an exemplary radiation detecting and measuring apparatus, generally indicated at 20, which is suitable for measuring the radioactive energy levels of test samples in accordance with the features of the present invention. As the ensuing description proceeds, it will become apparent that the present invention will find particularly advantageous use with radiation detecting equipment of the type used in detecting and measuring the activity or energy level of a test sample wherein a radioactive source is disposed within a solution containing a liquid scintillator, the latter having the characteristic property of producing light flashes when subjected to ionizing radiation. Such detectors are commonly referred to as "liquid scintillation detectors." The present apparatus 20 is primarily intended to receive and process sample vials containing such a liquid scintillator and radioactive source.

For this purpose, the apparatus 20 includes an outer housing, or shield and base assembly 21, which defines a vertically disposed detection well 22 adapted to receive sample vials one at a time in seriatim order. The shield and base assembly 21 is provided with a pair of laterally extending arms 24, 25 which serve to house proportional light transducers characterized by their ability to detect light scintillations in the sample vials and to convert such light scintillations into electrical signals, for example, voltage pulses which are proportional in amplitude to the light flash that causes the pulse. Such light transducers are well known in the art and need not be described in detail. As best shown in FIG. 1, the transducers may simply comprise a pair of photomultipliers PM1, PM2 which are mounted in oppositely disposed, coaxial, spaced relationship in the arms 24, 25 of the shield and base assembly 21. Thus, the photomultipliers are positioned on opposite sides of the detection well 22 so that sample vials 26 which are introduced into the well are mounted therebetween in light transmissive relationship therewith. The upper end of the shield and base assembly 21 comprises a generally cylindrical flange portion 28 having a planar upper surface 29 substantially coaxial with the detection well 22 and defining a cylindrical bore 30 suitable for receiving a shutter mechanism generally indicated at 31 (FIG. 2), of the type described in the aforesaid Olson Patent U.S. 3,198,948. The lower end of the shield and base assembly includes a generally box shaped housing or stand 32 suitable for housing control components used in conjunction with the apparatus 20. As shown in FIG. 1, the housing 32 may be provided with an access door 34 which permits of ease in both installation and servicing.

The general organization of the apparatus is such that the sample vial 26 may be lowered into the cylindrical detection well 22 during a "count" cycle to a position where the light scintillations occurring in the sample are detected and measured by the photomultipliers PM1, PM2. Since the latter are particularly sensitive to spectral radiation, provision is made for insuring that they are maintained in a light-tight housing at all times, so that the only light to which they are subjected is the scintillations occurring in the sample 26. It is for this reason that the upper end of the detection well is closed by a shutter mechanism 31 at all times other than when a sample is being loaded into the detection well 22 or ejected out of the detection well. While the particular means employed for delivering successive sample vials 26 to the apparatus is not critical to the present invention, those skilled in the art will appreciate that numerous types of automatic, semi-automatic, or manual sample changers or conveyors could be employed to bring successive samples to a point of registration with the upper end of the detection well 22. A typical completely automatic sample changer with which the present invention finds particularly advantageous use is disclosed in the copending application of Lyle E. Packard, Roy E. Smith, Alfred A. Munn and Edward F. Polic, Ser. No. 273,189, filed Apr. 16, 1959. A typical sample elevator mechanism is described in the aforementioned Olson U.S. Patent No. 3,198,948, the relevant details of which are included here for completeness. However, while it will be understood that the present invention can find use with a wide range of different types of automatic sample changers and sample elevator mechanisms, it is by no means exclusively limited to use with such sample changers. Indeed, the present invention will also find use in the less expensive manual versions of detection apparatus wherein successive samples are delivered to a point of registration with the detection well by hand (see e.g. Olson U.S. Patent No. 3,198,948).

Referring again to FIG. 1 the bases of the photomultipliers PM1 and PM2 are received within sockets 35, 35a and are inserted into the arms 24, 25 from the outer extremities thereof. To this end, the apparatus includes a pair of end caps 36, 37 which are hinged at their tops to the arms for pivotal movement about a vertical axis. The outer portion of the apparatus comprises a casing which may be made, for example, of aluminum and which is filled with suitable shielding material characterized by its ability to inhibit penetration of environmental background radiation. Such shielding material generally takes the form of lead and is here designated by the reference character 39. The lead shield defines a cylindrical transverse bore 40 into which the photomultipliers are coaxially inserted. Additional graded shielding means, generally indicated at 41 (FIG. 2) may be inserted into the bores 40 in surrounding relationship to the photomultipliers, although it will be understood that such additional shielding means is not critical to the present invention.

The detection well 22 includes an upper cylindrical bore 22a formed in the housing and the lead shield of base assembly 21. An enlarged tubular sleeve 50 extends upwardly into the housing and is secured in place by means of suitable threaded fasteners 51. The upper end of the tubular sleeve 50 is stepped, and serves to support a generally cylindrical collar 52, the latter having an upwardly extending generally rectangular flange 54. A vertical bore 22c, advantageously having a lesser diameter than the bore 22a (with conical surface 22b providing the transition), is formed in the lead 39, collar 52, and flange 54, the bores 22a and 22c being disposed in coaxial relationship. The flange 54 is further provided with a transverse slot (not shown in the views herein depicted) which extends entirely therethrough and which defines at its opposite ends a pair of windows adapted to be positioned adjacent the light receptive ends of the photomultipliers PM1 and PM2.

In order to maximize the conversion of light energy into electrical energy, a light pipe 58 is positioned in the slot, the light pipe defining a cylindrical vertical bore 22d coaxial with the bores 22a, b, and c, and having the same diameter as the bore 22c. As illustrated in the Olson patent, the light pipe 58 is a rectangular prism comprising pair of complementary mating blocks of light transmissive thermoplastic material having complementary abutting faces shaped to define the bore 22d. The oppositely disposed vertical walls of the light pipe are coupled to the photomultipliers PM1 and PM2 respectively in light transmissive relationship therewith when the block is positioned in the transverse slot. The remaining external walls are either painted or coated with a light reflective material which serves to insure that all light scintillations occurring in the sample 26 are reflected towards the light sensitive elements in the photomultipliers PM1, PM2.

Figure 5:
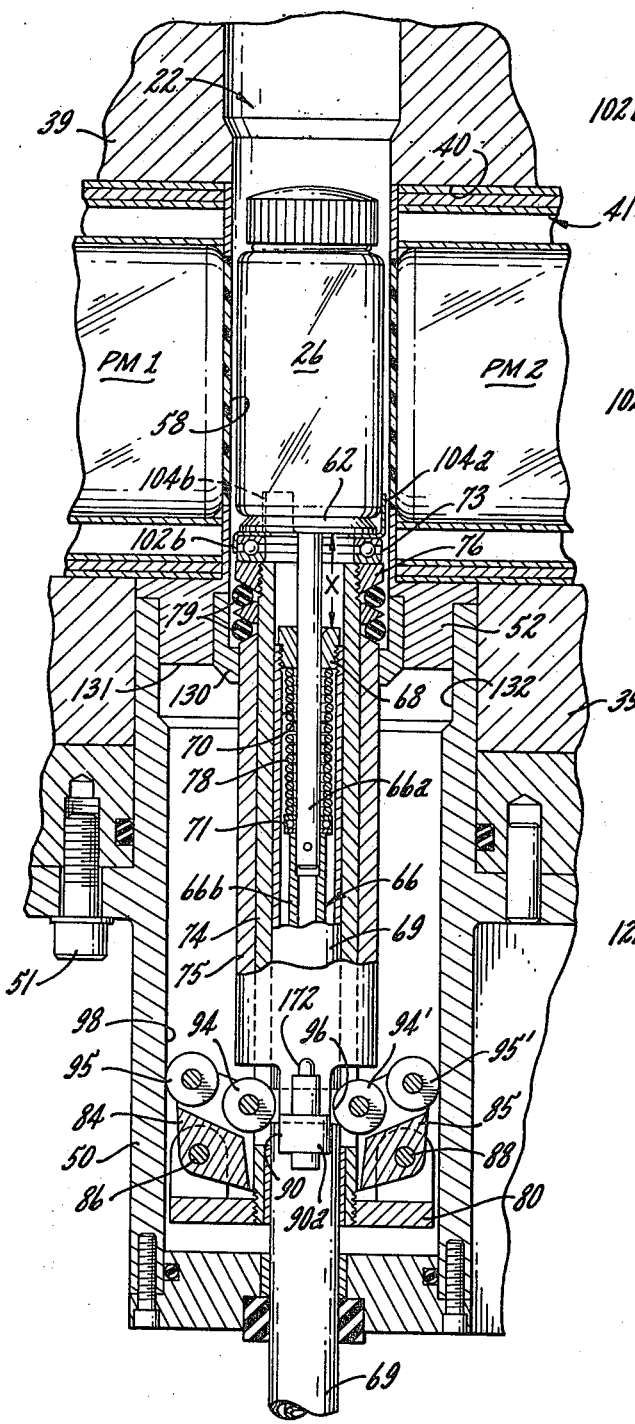
FIG. 5 is an enlarged, fragmentary, vertical sectional view of the apparatus of FIG. 1, here showing the sample transfer mechanism in the down, inward, or "sample loaded" position with the sample to be analyzed disposed between a pair of light transducers.

As best illustrated in FIGS. 2 and 5, when the foregoing components are assembled, the bores 22a, b, c and d define a substantially continuous elevator shaft or well 22 which houses an elevator platform 62 adapted to support the sample vials 26 and to effect vertical reciprocation thereof into and out of the count chamber defined by the light pipe 58. Platform 62 has a flat sample-receiving surface 63 and advantageously has beveled edges as shown. Provision is made for effecting vertical reciprocation of the elevator platform 62 inwardly and outwardly of the elevator shaft or well 22 so as to selectively load and unload sample vials 26 into and out of the count chamber defined by the light pipe 58, together with means for rendering the apparatus light-tight at all times and at all vertical positions of the elevator platform 62 in the apparatus, yet wherein there is no rubbing contact with the light pipe as the elevator mechanism passes therethrough.

In accordance with the invention, means are provided for rotating the sample vials 26 during the time when a sample vial 26 is in the count chamber defined by the light pipe 58 while the count is being made. Thus, as the sample is being counted during a predetermined counting and measuring period, it is simultaneously rotated about its axis so as to present all segments of the sample to the photomultipliers PM1, PM2. As a consequence, distortions in the count as a result of sample or sample vial asymmetries or non-homogeneities are average and cancelled out by allowing such photomultiplier to see the entire sample.

In keeping with the invention, an element of the elevator mechanism is made rotatable, and is caused to rotate at a predetermined angular velocity (and in a predetermined direction) at least while the sample vial 26 is being counted. To this end, and referring to FIGS. 5 and 8 jointly the elevator platform 62 is mounted to a rotatable shaft 66 which is driven via a linkwork mechanism by motor M2 so that the sample vial 26 is rotated as desired. In the embodiment herein shown, the elevator platform 62 is rotated at all times, both when the vials 26 are in the region of the light pipe 58 and the count is being made and while the elevator mechanism is reciprocating the sample vials into and out of this region. A feature of the invention is that such rotation does not adversely affect the light-tightness or other functions of the radiation detecting and measuring apparatus (20 in FIG. 1).

For optimum utilization of the invention, the elevator mechanism is provided with a sample centering device to laterally grip sample vials and thereby align the vial axially with the elevator mechanism. Such a centering device is described in Olson application Ser. No. 447,831, filed Apr. 13, 1965. The sample centering chuck or device 100 operating in conjunction with the described elevator mechanism is shown in elevation at FIG. 3 and in plan view at FIG. 4. Device 100 is formed from a single sheet of flat, resilient, spring steel or beryllium bronze about ten thousandths of an inch thick, and consists of a flat washer-like central portion 101 with three equally spaced fingers 104a–c located around its periphery and with a central hole 103 adapted to surround and be spaced away from cap 68 (FIG. 2). Fingers 102a–c extend outwardly of central portion 101 and then downwardly at right angles substantially about a diameter equal to the diameter of annular collar 76 (FIGS. 2 and 5), thereby centering the device 100 concentrically about the axis of the collar 76 and the elevator shaft 69.

Figure 3:
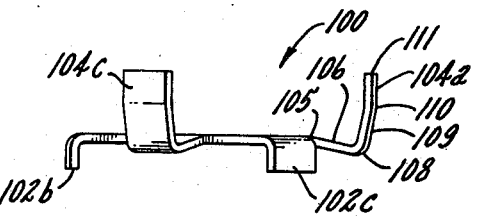
FIG. 3 is an enlarged elevation of one form of sample centering device recommended for use with the invention, the device being shown here (and in FIG. 2 on a smaller scale) in its relaxed position.
Figure 4:
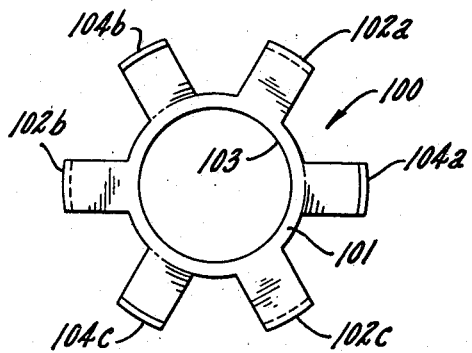
FIG. 4 is an enlarged top or plan view of the sample centering device of FIG. 3.

Referring to FIG. 3, it will be observed that the foregoing construction provides a centering device 100 having an inverted slightly dished, or Belleville shaped configuration.

Sample centering fingers 104a–c extend outwardly of central portion 101 and are advantageously bent in three places, as best shown in FIG. 3. The first bend 105 is in a slight downward direction at the periphery of central portion 101, the second bend 108 is at substantially right angles to the first bent portion 105 and in an upward direction, and the third bend 110 provides an uppermost portion 111 at substantially right angles to the plane of central portion 101. In this form the diameter of a circle defining the outermost edges of portion 111 is less than the diameter of bore 22 at FIG. 2. Bend 108 is located substantially at a distance equal to or slightly greater than that of sample vial 26 so that the vial fits loosely between the fingers 104a–c. All three of the fingers 104a–c are identical insofar as is commercially possible.

In operation, a sample vial 26 (FIG. 2) is placed either manually or automatically on the flat surface 63 of elevator platform 62, when the latter is projected outside of well 22. During the elevator lowering portion of the cycle (as will be described presently), the platform 62 and the vial 26 move downward to position the vial within the upwardly extending gripping fingers 104a–c as shown in FIG. 2. Further downward movement then compresses the centering device 100 between the bottom of platform 62 and the top of bearing 73 on inner sleeve 74, thus compressing the central portion 101 and the first bent portion 106 into a generally planar relationship with each other. As a consequence, portions 109 and 111 of fingers 104a–c are urged inwardly to converge or grip sample vial 26 at three equally spaced positions. Vial 26 is, therefore, positioned in the exact center of well 22, where no portions of the vial can rub against the sides of the well and where the light scintillations can be observed equally by photomultipliers PM1 and PM2.

For coupling the elevator platform 62 to the sample rotating motor M2 (FIGS. 1 or 8), the elevator platform 62 of FIG. 2 is carried by a series of coaxial shafts and sleeves in telescoping coaxial relationship. These include rotating shaft 66 (which is a series of shafts 66a, 66b, 66c, and 66d—per FIG. 8—pinned or welded into a unitary shaft, as shown), a non-rotating elevator sleeve or shaft 69, an inner sleeve 74, and an outer sleeve 75. Rotating shaft 66 is attached at its top portion to elevator platform 62 and at its bottom portion (FIG. 8) to a pinion in gear train 200 connected to motor M2. Thus, rotation of motor M2 is transmitted via rotating shaft 66 directly to elevator platform 62.

Elevator platform 62 and rotating shaft 66 are rotationally isolated from shaft 69 and sleeves 74, 75 by a pair of thrust bearings, shown in FIG. 2 as ball bearing 73 mounted onto collar 76 below platform 62 and as ball bearing 71 surrounding shaft 66a and between compression spring 78 and the top of shaft 66b.

Provision is also made for permitting relative movement between the inner and outer sleeves 74, 75, respectively, as the elevator mechanism is raised so as to clamp the O-rings 79 between the wedge-shaped faces of the collar 76, slide 77 and outer sleeve 75, thus deforming the sealing rings 79 and urging them laterally outward into intimate sealing engagement with the wall of the elevator shaft 22c. To this end, the inner sleeve 74 has rigidly secured to its lower end an annular mounting platform 80 having a pair of diametrically opposed upwardly extending brackets 81, 82. A pair of generally horseshoeshaped links 84, 85 are pivotally mounted at 86, 88 respectively, to the brackets 81, 82. The lower ends of the links each terminate in a pair of force transmitting links 89 which partially surround the elevator shaft 69 and which are adapted to support a pair of diametrically opposed, downwardly projecting tangs 90 integral with the lower end of the outer sleeve 75. The links 84, 85 are bifurcated to form vertically disposed slots 91, 92, respectively, the links supporting inner rollers 94, 94', respectively, and outer rollers 95, 95', respectively, with the rollers 94, 95 journalled for rotation in the slot 91 and the rollers 94', 95' journalled for rotation in the slot 92. The elevator shaft 69 is provided with an undercut annular groove 96, dimensioned to receive the inner rollers 94, 94' when the elevator is in its lowermost position (as seen in FIG. 5). In this condition, rollers 94 are maintained snugly within the groove 96 while the rollers 95 engage and roll upon the inner wall 98 of the sleeve 50.

For the purpose of effecting vertical movement of the elevator shaft 69, a reversible electric or fluid operated lifting and lowering mechanism M1 of conventional type is rigidly supported by the shield and base assembly 21 on a motor mounting bracket (FIG. 1). Mechanism M1 is actuated either manually or automatically by external controls of the type described in the Olson Patent U.S. 3,198,948 and, since mechanism M1 is coupled to elevator shaft 69, actuation of the former moves the latter to lower and raise a sample 26 into and out of the count chamber defined by the bore 22d in the light pipe 58. As shown symbolically in FIG. 1, mechanism M1 is also coupled to shutter mechanism 31 (FIG. 2) via shutter operating shaft 33.

In carrying out the invention, means are provided for effecting relative movement between the inner and outer sleeves 74, 75 during an "unload" cycle, (i.e., when the elevator shaft 69 is moved upwardly to eject a sample 26), thus serving to compress the O-rings 79 and effecting a light-tight seal which serves to seal the photomultipliers from spectral radiation when the shutter mechanism 31 is open. To this end, when the mechanism M1 is energized during an "unload" cycle, the elevator shaft 69 starts to move upwardly from the position shown in FIG. 5, to the position shown in FIG. 2. During the initial portion of the upward movement, the rollers 95 are snugly engaged with the inner surface 98 of the tubular sleeve 50 and thus serve to rigidly clamp the rollers 94 in operative driving relationship with the groove 96 formed in the elevator shaft 69. Since the sleeve 50 prevents outward movement of the rollers 95, the rollers 94 cannot leave the groove 96 in the elevator shaft and, consequently, a vertical drive force is transmitted through the rollers 94 to the links 84, 85 and thence to the mounting plate 80. Consequently, the sleeves 74, 75 slide upwardly as a unit within the elevator shaft 22. However, as best illustrated in FIGS. 2 and 5, a positioning guide ring 130 mounted in the collar 52 serves to guide the sleeves during their upward movement, thus maintaining the bearing 73, outer sleeve 75, the collar 76, platform 62 and O-rings 79 out of contact with the defining walls of the elevator shaft 22. Since these elements do not contact the walls of the elevator shaft, and in particular, do not contact the thermoplastic material of the light pipe 58, there is no tendency to produce light or other effects which may cause spurious output signals from the photomultipliers PM1–PM2. The arrangement is such that the sealing O-rings 79 are maintained out of contact with the walls of the elevator shaft during their entire transit through the light pipe 58. Of course, during the initial portion of the "unload" cycle, it is not necessary that a light-tight seal be effected by the O-rings 79 since the shutter assembly 31 is still closed.

Provision is also made for pivoting the links 84, 85 outwardly about their respective pivot points 86, 88, thus serving to urge the outer sleeve 75 upwardly relative to the inner sleeve 74 through coaction of the opposed pairs of lugs 89 and the tangs 90. To this end the rollers 95, 95' are journalled to links 84, 85, respectively, at points located outwardly relative to the pivot connections 86, 88. The arrangement is such that as the rollers 95, 95' initially contact the stop surface 131 defined by the lower end of the collar 52, a force is created which tends to urge the rollers outwardly into an annular groove 132 formed at the upper end of the tubular sleeve 50 (FIG. 2). When this occurs the links 84, 85 pivot outwardly about their respective pivot points 86, 88 and the rollers 94, 94' are freed from the groove 96 formed in the elevator shaft 69, thus permitting continued upward movement of the elevator shaft.

It will be appreciated from the foregoing description, that as the elevator shaft 69 moves upwardly under the influence of the continuously driven mechanism M1, at the instant that the rollers 95, 95' strike the stop surface 131 defined by the collar 52, continued vertical movement of the mounting platform 80 and the integral inner sleeve 74 terminates. Thus, the collar 76 disposed on the upper end of the inner sleeve 74 defines a stop surface for the O-rings 79. As the elevator shaft 69 continues to move upwardly, the links 84, 85 pivot outwardly with the rollers 95, 95' being received within the annular groove 132 formed at the upper end of the sleeve 50. As a consequence of this movement, the opposed pairs of force transmitting links 89 are positively urged upwardly into engagement with the lower surface of the downwardly depending tangs on the outer sleeve 75, thus shifting the outer sleeve upwardly relative to the inner sleeve and deforming the O-rings 79 into light-tight sealing relationship with the walls of the elevator shaft 69 at a point well above the light pipe 58. Of course, as the elevator drive shaft 69 continues to move, the groove 96 formed therein moves upwardly out of registration with the rollers 94, 94' and consequently, the rollers begin to ride on the surface of the elevator drive shaft 69 so as to lock the links 84, 85 in their outward pivoted condition and preventing release of the compressive sealing force exerted on the O-rings. Moreover, the tendency to create a compressive sealing force is enhanced by the provision of the compression spring 78 which exerts downward forces on the inner sleeve 74 and collar 76 tending to oppose the forces created by the upwardly moving outer sleeve 75.

At this point in the "unload cycle," the elevator shaft 69 is moving upwardly and the sample vial 26 supported on the elevator platform 62 is disposed within the bore 22a defined by the housing and lead shield 39. The upper end of the sample vial is still disposed beneath the shutter mechanism 31 and since the latter is still closed, provision must be made for terminating vertical movement of the sample vial 26 while the shutter mechanism is open. Of course, since the sealing rings 79 are now in intimate light-tight sealing relationship with the walls of the elevator shaft 61, opening of the shutter mechanism 31 will not subject the photomultipliers to an external source of spectral radiation.

For the purpose of permitting the shutter mechanism 31 to be opened while at the same time maintaining the sample vial 26 in substantially the same position as illustrated in FIG. 2, the exemplary elevator mechanism includes a "lost motion" connection which allows the non-rotating elevator shaft 69 to continue upwardly without effecting further upward movement of the platform 62. To this end, and referring to FIGS. 5 and 8, it will be observed that spring 78 is normally in compression between cap 68 and thrust bearing 71, which in turn is mounted rotatably on rotating elevator shaft 66b. Cap 68 is threaded onto non-rotating elevator shaft 69, which in turn is fixedly mounted onto transverse bracket 111. Thus, upward and downward motion of transverse bracket 111 through action of motor M1 of FIG. 1) is translated directly to a corresponding motion of non-rotating shaft 69 and cap 68, but does not effect axial or longitudinal movement of rotating shaft 66 or its associated elevator platform 62 provided (a) spring 78 is not compressed to its maximum or (b) rotating shaft 66 has not been moved upward by distance $x$ (FIG. 5) so that cap 68 engages the bottom of elevator platform 62. These limits are herein referred to as the "lost motion" distance.

At this point in the "unload cycle" of operation, the thrust bearing 71 which is coupled to the elevator rod or rotating shaft 66 is in the position shown in FIG. 2 but is capable of movement toward the cap 68 by a distance $x$ (FIG. 5). In like manner, the top surface of the cap 68 is spaced a short distance from the bottom of the platform 62 but is capable of further movement by distance $x$. The compression spring 78 is still compressed, and thus tends to urge the rod or rotating shaft 66 and bore 70 into full telescoped relation—that is, the spring 78 tends to hold the platform 62 in snug conformity to the upper end of the stationary inner sleeve 74 while the elevator shaft 69 moves upwardly from the position shown in FIG. 5 to the solid line position shown in FIG. 2. It is during this period of vertical elevator shaft movement that the shutter mechanism 31 is opened and, thereafter, continued upward movement of the elevator shaft 69 serves to directly drive the elevator platform 62 through coaction with the cap 68 from the solid line position shown in FIG. 2, to the upper position represented by the phantom lines wherein the elevator platform 62 is disposed well above the upper surface 29 of the shield and base assembly.

During the time when the non-rotating elevator shaft 69 is moving upward from the position shown in FIG. 5 until just before it reaches that of FIG. 2, fingers 104 of sample centering device 100 are maintained in resiliently gripping relationship with the bottom of sample vial 26 by the compressive action of the bottom of platform 62 against the top of bearing 73. (Spring 78 is sufficientlyy stiff to flatten portion 106 of fingers 104).

As elevator shaft 69 continues moving upward it moves into the position shown in solid lines in FIG. 2. At this point platform 62 has moved upwardly away from the top of collar 76, permitting portion 106 of fingers 104 to return to their relaxed downwardly-bent position and so release fingers 104 from vial 26. It will be observed that in this form of the invention release of fingers 104 occurs in the enlarged bore 22a of well 22, that is, above tapered surface 22b, to prevent fingers 104 from contacting the walls of elevator well 22.

For the purpose of providing an effective light-tight seal for the detection apparatus 20 when the apparatus is in a counting cycle of operation, the exemplary shutter mechanism 31 provides an effective tortuous path which is, for all practical purposes, substantially impenetrable by spectral radiation when the shutter is in the closed position. The shutter mechanism 31 forms no part of the present invention and may take any of several forms, one of which is described in the aforementioned Olson Patent U.S. 3,198,948. Consequently only a brief description will here be given. Shutter mechanism 31 may be actuated manually or automatically, the latter mode being in synchronism with the operation of mechanism M1 via shutter operating shaft 33 (FIG. 1). In any event, shutter mechanism 31 is opened or closed, as the case may be, during the "lost motion" period while the elevator shaft 69 is ascending or descending.

As suggested in FIG. 2, the shutter mechanism 31 comprises a plurality of fixed blades secured in recess 30 and a plurality of interleaved pivotable blades 33a mounted on shutter operating shaft 33, which in turn is rotated by mechanism M1. The fixed blades are provided with a series of sample transmitting apertures in register with each other, each aperture having the same diameter as bore 22a.

The movable shutter blades 33a are mounted for pivotal movement about the axis of shutter operating shaft 33 from a position totally closing the upper end of the elevator shaft to a position totally opening the elevator shaft and permitting passage of a sample therethrough. When in the closed position, the light path through the shutter mechanism 31 is a substantially tortuous path defined by the coacting faces between the interleaved fixed and pivotable blades. To facilitate sliding movement of the blades relative to one another, they are preferably made of a material having a relatively low coefficient of sliding friction, for example, a relatively hard plastic material. In order to effect pivotal movement of the movable blades in unison, the blades are keyed to shaft 33, thus serving to clamp the movable blades together.

Provision is made for effecting pivotal movement of the movable shutter blades as an incident to upward movement of the drive shaft and during the time that the elevator shaft 69 is moving through its "lost motion" connection to the elevator platform. To this end, shutter operating shaft 33 is rotated (by a cam arrangement described in the Olson Patent U.S. 3,198,948) during upward movement of the elevator shaft 69 at the same time that the elevator shaft starts to move through its "lost motion" connection. As the elevator shaft 69 continues upwardly through a linear distance $x$ corresponding to the permissible amount of "lost motion" by the connection shown in FIG. 5, the operating shaft 33 serves to shift the shutters from their fully closed position to their fully open position. At this point, the shutter mechanism 31 is completely open and when the upper end of the cap 68 bottoms on the lower surface of the elevator platform 62, continued upward movement of the shaft 69 will serve to raise the sample vial upwardly through the now open shutter mechanism to the phantom position shown in FIG. 2.

Of course, those skilled in the art will appreciate that during a "sample load" cycle when the elevator mechanism is moving downwardly, the synchronous actuation of the sample centering device 100 and the shutter mechanism 31 is substantially the same as described above. During this cycle of operation, shutter operating shaft 33 (FIG. 1) will initially commence closing shutter 31 (FIG. 2) at approximately the same time that the elevator platform 62 bottoms against the sample centering device 100 and the upper end of the inner sleeve 74. Consequently, during the time that the shaft 33 is operating to close the shutter mechanism 31, the elevator shaft 69 moves downwardly a distance $x$ corresponding to its "lost motion" connection. Thus, the O-ring seals 79 remain expanded in light-tight sealing relationship with the elevator shaft 61 until the shutter mechanism 31 is completely closed.

Referring to FIG. 2, it will be noted that the downwardly extending tangs 90 integral with the outer sleeve 75 are provided with laterally projecting bosses 90a, each of which serves to support an upwardly extending, spring loaded pin 172. The arrangement is such that when the elevator shaft moves upwardly and the links 84, 85 are pivoted outwardly, the pin 172 bottoms on the stop surface 131 and is compressed against the bias provided by the springs. Consequently, as the elevator shaft returns to the position shown in FIG. 5, the spring loaded pins 172 tend to urge the bosses downwardly relative to the stop surface 131. This serves to pivot the links 84, 85 and return the rollers 94, 94' inwardly into operative engagement with the groove 96 formed in the elevator shaft. Thus, as the elevator shaft 69 continues downwardly to its "sample loaded" position, the rollers 95, 95' are pivoted inwardly and ride along the inner surface 98 of the tubular sleeve 50. This serves to again lock the inner and outer sleeves 74, 75 into operative engagement with the elevator shaft 69 and, the entire assembly moves downwardly as a unit. At the instant that the spring loaded pins 172 urge the links 84, 85 inwardly, the outer sleeve 75 moves downwardly relative to the inner sleeve 74, thus freeing the O-rings 79 from the deforming forces and permitting them to return to their normal nonexpanded position. Therefore, as the elevator mechanism 64 moves downwardly, the O-ring seals are maintained out of contact with the plastic light pipe 58, thus insuring that no spurious signals are produced in the photomultiplier as a result of rubbing contact with the seals, and at the same time substantially prolonging the life of the seals since they are not subject to wear.

Figure 6:
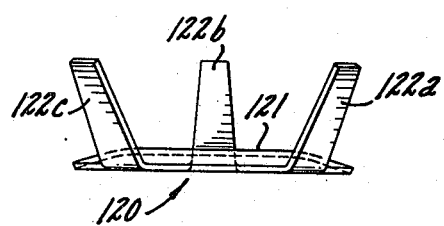
FIG. 6 is an enlarged elevational view similar to FIG. 3 of a slightly modified sample centering device alternatively recommended for use with the present invention.

Referring now to FIG. 6, there has been depicted a slightly modified type of centering device 120 which is somewhat similar in construction and mode of operation to the centering device 100 described above and also embodying the present invention. In view of the similarity between the two exemplary centering devices of the invention, like parts in both forms of the invention will be designated by identical reference numerals and those parts not common to the two systems will be designated by different reference numerals.

As shown in FIG. 6, the modified form of centering device 120 (which is preferably formed of the same resilient spring material as is the device 100 shown in FIG. 3) includes an annular central portion 121 having an inverted dished or Belleville shaped vertical cross section. A plurality of equally spaced fingers (three such fingers 122a, 122b, and 122c being shown in the drawings) are formed integrally with the central portion 121 and are disposed about the periphery of the latter, the fingers being substantially perpendicular to the portion 121 at the plane of tangency passing through the base of the fingers. It will, of course, be understood as the ensuing description proceeds, that in this form of the invention, as in the form shown in FIG. 3, more than three upwardly projecting fingers could be provided if desired. As here shown the fingers 122a–122c taper slightly towards their free extremities and, when the device 120 is in its natural or relaxed state (as shown in FIG. 6), the fingers diverge from one another with the free extremities of the fingers terminating in a circle having a diameter substantially greater than the diameter of the central portion 121.

As best shown in FIG. 7, the arrangement is such that the modified centering device 120, when positioned beneath the elevator platform 62 and on the bearing 73 in surrounding relation to the elevator drive shaft 69, serves to precisely center itself relative to the axis of the detection well 22. Thus, the diverging tips of the fingers 122a–122c are preferably so dimensioned that when the centering device is in the solid line relaxed position shown in FIG. 7, the tips of the fingers engage the wall defining the bore 22a, thereby accurately centering the annular central portion 121 relative to the axis of the detection well. However, since the points of contact between the device 120 and the bore 22a are above the seals 79, spectral radiation that might be produced incident to rubbing contact, if any, between the fingers and the bore 22a will not produce spurious signals from the photomultipliers.

In operation, and assuming that the O-rings 79 are expanded into sealing engagement with the bore 22c, the elevator platform 62 is free for vertical reciprocation above the stationary seal defined by the O-rings for the purpose of introducing and ejecting sample vials 26 in the manner heretofore described. During a sample loading cycle, the elevator platform 62 will bottom on the bowed spring portion 121, thus compressing and flattening the latter between the platform 62 and the bearing 73 indicated at 121' in FIG. 8. This serves to draw the tips of the fingers 122a–122c inwardly into substantially parallel vertical positions, e.g., the phantom position 122a' and 122b' shown in FIG. 7. In this position, the fingers snugly embrace the sample vial 26 and center the latter relative to the axis of the detection well 22. And, of course, since the biasing force exerted on the device 120 by the platform 62 is in a downward direction, the device remains accurately centered even though the fingers 122a–122c no longer contact the bore 22a. It will, of course, be appreciated that the centering device 120 is preferably so dimensioned that when in the vial centering position, the entire elevator assembly, including the device 120, can reciprocate within the light pipe 58 without rubbing contact therewith, thus insuring that no spurious signals are produced by the photomultipliers PM1, PM2. During a sample unloading cycle, once the O-rings 79 are expanded and the platform 62 starts to move upwardly relative to the collar 76, the device 120 returns to its relaxed bowed state, whereupon the tips of the fingers 122a–122c again engage the wall defining the bore 22a so as to insure that the spring centering device remains accurately centered.

Turning now to FIG. 8, an enlarged fragmentary vertical section shows one form of a device for rotating a sample vial while measuring radioactivity so as to eliminate errors caused by non-symmetrical or non-homogeneous samples or sample vials. FIG. 8 is a continuation of the lower portion of FIG. 5, with rotating shaft or rod 66 taking the form of hollow shaft 66b welded to shaft 66c which in turn is pinned to motor shaft 66d, and with non-rotating elevator shaft 69. Elevator shaft 69, it will be observed, is necked down at its lower end 201, and this end is snugly fitted into a bore 202 in transverse bracket 111, which is coupled to shutter operating shaft 33 (FIG. 1) at its lower undercut portion 112 via bolt 115.

As noted before, motor shaft 66 is connected to a gear train 200 driven by motor M2 at a predetermined angular velocity. Motor M2 and gear train 200 are not mounted onto apparatus 20 (FIG. 1), so they are free to rise and descend, first as the sample elevator mechanism is extended outwardly and inwardly of the counting zone of detection well 22 (FIGS. 1, 2, and 5), and second to conform with the lost motion action (distance $x$ in FIG. 5) between rotating shaft or rod 66 and nonrotating elevator shaft 69.

Guide pin 202 secured to gear train 200 and slidably received in guide bearing 203 allows vertical movement but prevents angular movement of gear train 200 with respect to transverse bracket 111. Pin 202 may be either circular or non-circular in cross section, the former being preferred from the standpoint of ease of manufacture but the latter having the advantage of preventing radial load between shaft 66c and the corresponding inner surface 205 of lower end 201 on elevator shaft 69. Pin 202 is sufficiently long to remain within bearing 203 during the lost motion action.

FIG. 9 shows an alternative sample rotating device, also in enlarged vertical section, for rotating the sample with an oscillatory motion. As in the case of the FIG. 8 device, this includes motor M2 coupled via gear train 200 to rotating shaft 66. There are however two differences; the FIG. 9 device is provided with means to effect oscillatory rotation of shaft 66c, and motor M2 and gear train 200 are immovably mounted to transverse bracket 111 (via angle bracket 206). In other respects the devices function alike, and for convenience like components are identically numbered.

As shown in FIG. 9, gear train 200 transmits rotation via pinion 208 to idler gear 209 and then to a splined pinion 210 attached to shaft 66c. Idler gear 209 is journalled to angle bracket 206 by shaft 211 rotating in bearing 212, and is equipped with a pair of cams 214, 215 (best shown in FIG. 10) for the purpose of reversing the polarity, and hence direction of rotation, of DC motor M2.

FIG. 10 schematically shows the plane view taken along line 10—10 of FIG. 9, including pinions 208, 210 and idler gear 209. Idler gear 209 has cylindrical cams 214, 215 mounted thereon which engage polarity-reversing microswitches S–1 and S–2. As a result, when idle gear 209 is rotating in a clockwise direction, motor M2 will continue to turn the gears 208, 209, 210 until cam 215 trips S–2, at which time motor M2 is reversed and idler gear 209 is rotated counterclockwise until cam 214 engages S–1, whereupon the polarity is again reversed and the operation repeated. The relative sizes of idler gear 209 and pinion 210 determine the number of revolutions of the latter between corresponding actions of switches S–1, S–2, and accordingly cams 214, 215 are located on idler gear 209 such that pinion 210 (and shaft 66c of FIG. 9) makes one complete rotation before its direction is reversed.

Because the motor M2 and gear train 200 of FIG. 9 are fixedly mounted onto the transverse bracket 111, the splines of pinion 210 are made sufficiently long to allow shaft 66c to move a distance equal to the lost motion action (distance x in FIG. 5) without disengaging pinion 210 from idler gear 209. In the position shown in FIG. 9, the elevator is in the sample unload or load position as shown in FIG. 2.

It is preferred that, whether the rotating device be that of FIG. 8 or FIG. 9, motor M2 be energized at all times to effect continuous rotation of the elevator mechanism and sample vial. However, this is not essential, it being required only that rotation be maintained during the counting period. If it is desired that the vial be rotated only during the measuring or counting period, a switch S–3 (FIG. 8) may be incorporated into the motor M2 power line to operate the motor only when the elevator mechanism has been lowered to the counting position shown in FIG. 5. In this position, transverse bracket 111 trips the spring-loaded switch S–3 and closes the motor M2 power circuit. At other times the motor M2 is inoperative and accordingly the sample vial is not rotated.

Although virtually any degree of rotation of elevator platform 62 affords a meaningful improvement in the accuracy and precision of radiation counting, certain principles are significant in realizing the maximum benefits of the invention. Firstly, the platform 62 and its sample vial 26 ideally should be rotated by an integer number of complete (360°) revolutions during a predetermined counting period, and such rotation should be of a uniform angular velocity. Thus, in a counting period of, say, twenty minutes, the sample vial should be rotated once, twice, etc., or up to about five complete revolutions at constant rotational speed. Further, while by reason of simplicity of equipment design and manufacture, it is preferred that the rotation be in one angular direction (FIG. 8), it is possible and occasionally advantageous to rotate the sample in an oscillatory manner (FIGS. 9 and 10), that is, with one or more complete revolutions in one direction, followed by an equal number of revolutions in the opposite direction, etc.

Additionally, and particularly when installing sample rotation mechanisms in existing counting apparatus, it may not be mechanically possible to insure that the sample is rotated by a number of complete revolutions. In this event, the sample should be rotated by a large number of revolutions during a counting period, e.g. twenty times, so that the effects of asymmetry or inhomogeneity will be cancelled by averaging the effects over a large number of rotations. Thus the maximum counting error due to asymmetry or inhomogeneity will be the reciprocal of the number of revolutions (e.g., 1/20=5%).

Example I

This example illustrates and demonstrates the effects, separately and in combination, of sample centering and sample rotation while scintillation counting a radioactive sample dissolved in a scintillator.

The detecting and measuring apparatus is a Packard Model 3365 Tri-Carb dual photomultiplier scintillation counter of the type generally described herein, provided with a motor and reduction gear for rotating the sample platform at one revolution per ten minutes in one direction.

A spectrometer was used with coincidence "off," and input selector set to record the counts from each photomultiplier. The output of each photomultiplier was recorded separately.

The sample was a carbon-14 compound, its activity being approximately 50,000 c.p.m. It was placed in a screw top (22 mm.) plastic vial of 1.078" to 1.083" inner diameter, 0.042" to 0.045" wall thickness, $2^{13}/_{32}$" overall height, 1½" body height, and 0.012" maximum wall taper. The liquid level was $1^{11}/_{32}$" above the vial bottom.

For the first test, the sample was glued $1/_{32}$" off center on the elevator platform. The ratemeter results (from one channel) are shown in FIG. 11. The right hand portion of FIG. 11, labeled "Stationary," depicts the results that are observed with a conventional non-rotary sample elevator, namely, a relatively constant ratemeter reading of about 49,000 c.p.m.

However, the accuracy of this reading is illusory as shown by the left hand portion of FIG. 11, labeled "One Revolution of Sample." Here it is noted that, depending on the position of the sample vial, the instantaneous results range from about 48,500 to about 51,000 c.p.m. This variation is caused solely by the asymmetric placement of the sample vial. It is only by reason of the chance orientation of the vial in a given position that the constant rate was about 49,000 c.p.m.; other random placements would afford readings of anywhere from 48,500 c.p.m. to a high of 51,000.

In accordance with the invention, integration and averaging of the left hand (rotating sample) portion of FIG. 11 provides reading that is precise and accurate, and is free from the error caused by asymmetric sample placement. Such integration may be performed conventionally, e.g. by electronic integration or by plassimetric techniques.

For the second test, the sample is used but the scintillation counter is provided with a six-finger vial centering chuck of the general type described herein. As shown in FIG. 12, the instantaneous count rate is substantially less dependent on vial orientation than in the case of the first test—the precision is about one percent. Nevertheless, FIG. 12 clearly shows that vial centering alone is insufficient to insure against random asymmetries and inhomogeneities, since the instantaneous count rate still is a function of vial orientation.

Example II

To demonstrate the effectiveness of the present system with asymmetric samples, a series of tests was set up to count carbon-14 tagged glycine (20,000 c.p.m., carboxyl tagged) in the form of a spot on a sheet of filter paper placed within plastic screw-cap vials. For each test, the filter paper was inserted in a vial in one of four configurations, as indicated in the table below. The vial was filled with a liquid scintillator and inserted into the counting chamber of a dual-phototube scintillation counter equipped with a vial centering chuck of the type here described. The counter was set to record only coincident scintillations.

Each sample was counted for 20 minutes, which constituted one reading. For half of each test the sample was randomly placed in the chamber, a reading was made with the sample stationary, and the sample was removed and replaced; this was repeated approximately fifty times. For the other half of each test, the sample was randomly placed in the chamber, a reading made while the sample was being rotated at one r.p.m., and the sample removed and replaced; this likewise was repeated about fifty times.

At the end of each test the readings were recorded and the range of readings (i.e., minimum and maximum) for each sample and for each of stationary and rotate modes were compared. The results, summarized below, demonstrate the significant improvement in precision obtained by rotating the sample.

Parenthetically, it is believed that a slower rate of rotation, e.g., $1/_{10}$ r.p.m., would be even more effective with respect to improving precision and accuracy.

RANGE OF MEASUREMENTS, C-14 TAGGED SPOT SAMPLE, 10³ COUNTS PER 20 MINUTES

|  | Rotate | | Stationary | |
| --- | --- | --- | --- | --- |
|  | Min. | Max. | Min. | Max. |
| Spot on center of rectangle, transversely in vial | 128.3 | 132.4 | 126.0 | 135.8 |
| Spot on center of rectangle, coiled cylinder in vial | 126.0 | 130.0 | 115.3 | 129.4 |
| Spot on center of disc, horizonatlly in vial | 97.8 | 100.2 | 95.9 | 101.7 |
| Spot off center on disc, pinned transversely in vial | 79.4 | 81.8 | 74.3 | 84.7 |

Although the primary utility of the present invention is in precision dual-photomultiplier scintillation counting apparatus, it is evident from the foregoing that the advantages of the invention are not so limited in their application. For example, radiation detection and measuring apparatus using only one photomultiplier, or two Geiger counters or similar ionizing radiation-responsive detectors in place of light-responsive detectors (i.e., in place of PM1 and PM2) can be used, and similarly benefit from sample rotation. In addition, while it is generally most convenient to maintain the detectors stationary and rotate the sample, the converse may be useful under particular circumstances.

I claim as my invention:

1. Apparatus for detecting and measuring the radioactivity of a sample, said apparatus being characterized by minimizing distortions in observed radioactivity as a result of sample or sample vial asymmetries and non-homogeneities, comprising:
   a radioactivity detecting and measuring zone for receiving a sample,
   means for placing said sample into said radioactivity detecting and measuring zone, for retaining said sample in said zone for a detecting and measuring period, and for removing said sample from said zone after said period,
   means near said zone for detecting and measuring radioactivity of said sample while in said zone in response to light scintillations,
   and means for rotating said sample while in said zone whereby all segments of said sample are presented to said detecting and measuring means so that said means observe the entire sample and consequently said asymmetries and non-homogeneities are averaged and cancelled out.

2. Apparatus of claim 1 wherein said sample is rotated during said period at a uniform angular velocity by at least one complete revolution.

3. Apparatus of claim 2 wherein said radioactivity detecting and measuring zone is within a vertically disposed, generally cylindrical well, wherein said placing-retaining-removing means is a sample elevator extensible inwardly and outwardly of said well, and wherein at least a portion of said elevator imparts rotation to said sample.

4. Apparatus of claim 3 wherein said elevator includes means for laterally gripping said sample during rotation of said sample to thereby align said sample axially with said rotation-imparting elevator portion.

5. Apparatus of claim 4 wherein said gripping means are activated during placing of said sample into said radioactivity detecting and measuring zone, and are deactivated during removing of said sample from said zone.

6. Apparatus of claim 1 wherein said sample is rotated during said period by a small integer number of complete revolutions.

7. Apparatus of claim 1 wherein said sample is rotated during said period by a large number of revolutions.

8. Apparatus of claim 1 wherein said sample is rotated during said period in one angular direction.

9. Apparatus of claim 1 wherein said sample is rotated during said period by an oscillatory motion, one complete revolution in each direction.

10. Apparatus of claim 1 wherein said sample is rotated during said period at a uniform angular velocity.

11. Apparatus of claim 1 wherein said sample is rotated during a predetermined detecting and measuring period at a uniform angular velocity, in one angular direction, by at least one complete revolution.

12. The method of detecting and measuring the radioactivity of a sample, said method being characterized by the minimization of distortions in observed radioactivity as a result of sample or sample vial asymmetries and non-homogeneities, comprising:
   placing a sample into a radioactivity detecting and measuring zone having means near said zone for detecting and measuring radioactivity of said sample while in said zone in response to light scintillations,
   retaining said sample in said zone for a detecting and measuring period, and
   rotating said sample while in said zone whereby all segments of said sample are presented to said detecting and measuring means so that said means observe the entire sample and consequently said asymmetries and non-homogeneities are averaged and cancelled out.

13. Method of claim 12 wherein said sample is rotated by a small integer number of complete revolutions durng a predetermined measuring period.

14. Method of claim 12 wherein said sample is rotated during said period by a large number of revolutions.

15. Method of claim 12 wherein said sample is rotated during said period in one angular direction.

16. Method of claim 12 wherein said sample is rotated during said period by an oscillatory mottion, one complete revolution in each direction.

17. Method of claim 12 wherein said sample is rotated during said period at a uniform angular velocity.

18. Method of claim 12 wherein said sample is rotated during said period during a predetermined measuring period at a uniform angular velocity, in one angular direction, by at least one complete revolution.

References Cited

UNITED STATES PATENTS 2,885,557   5/1959   Kizaur.

RALPH G. NILSON, Primary Examiner

MORTON J. FROME, Assistant Examiner

U.S. Cl. X.R.

250—106